E. C. BALLMAN.
RECTIFIER FOR ALTERNATING CURRENTS.
APPLICATION FILED AUG. 6, 1914.
1,239,249. Patented Sept. 4, 1917.
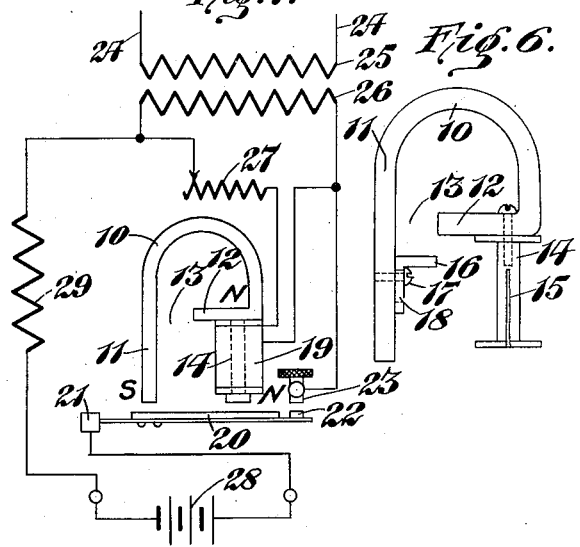
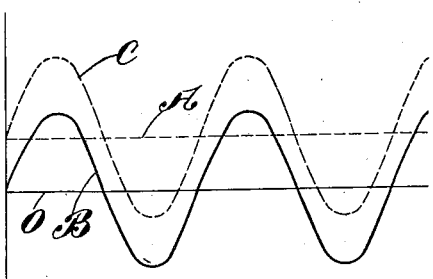
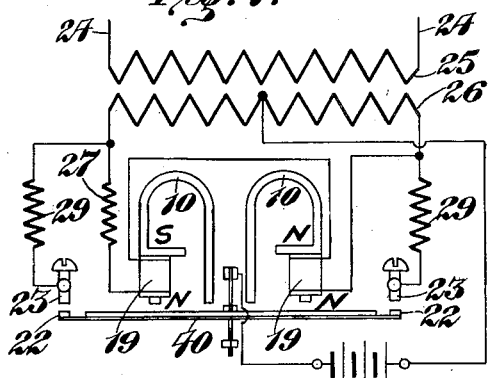
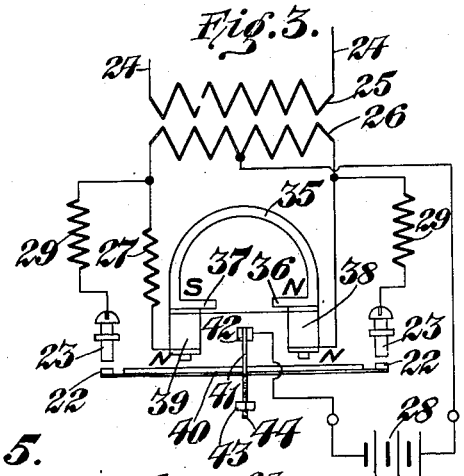
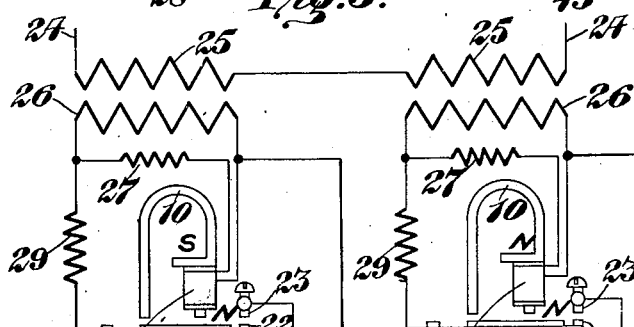
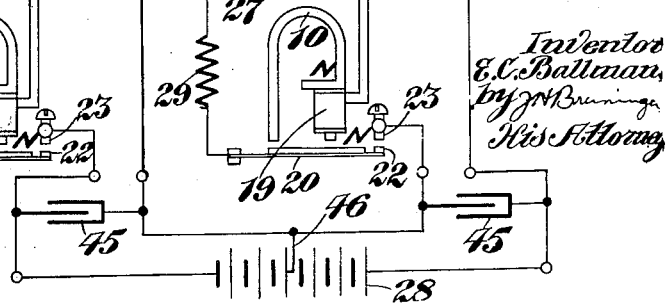

UNITED STATES PATENT OFFICE.

EDWIN C. BALLMAN, OF KIRKWOOD, MISSOURI.

RECTIFIER FOR ALTERNATING CURRENTS.

1,239,249.   Specification of Letters Patent.   Patented Sept. 4, 1917.

Application filed August 6, 1914. Serial No. 855,380.

*To all whom it may concern:*

Be it known that I, EDWIN C. BALLMAN, a citizen of the United States, and residing at Kirkwood, in the county of St. Louis and State of Missouri, have invented certain new and useful Improvements in Rectifiers for Alternating Currents, of which the following is a specification.

This invention relates to rectifiers for alternating currents, and more particularly, to rectifiers of the vibrating type.

Vibrating rectifiers, as now constructed, utilize a magnet of constant polarity, and provided with an alternating current winding for superimposing on the constant flux an alternating flux which is in step with the current to be rectified. There are two general types of these rectifiers. In one of these types the constant flux is set up by a direct current winding in circuit with the battery to be charged, the magnet core being, in this case, of soft iron. This construction is, however, open to the objection that, where the battery to be charged has not a sufficient residual charge to effect the alternating flux sufficiently to produce synchronous operation in the proper direction, the battery is liable to receive current in the wrong direction. In another type, the magnet is a permanent magnet and the constant flux is set up by the permanent magnetism. While this construction obviates the objection to the battery excited magnet construction, the passage of that component of an alternating flux which is opposite to the permanent flux, through the entire magnetic circuit of the permanent magnet will tend to demagnetize this permanent magnet and, therefore, vary the value of the constant flux and effect the permanency of the magnet.

Some of the objects of this invention therefore are, to construct a rectifier system which is permanent and uniform in its action, which is arranged to be connected to the direct current load without liability of a reversal of current, which has a wide range of frequency, and in which the sparking is reduced to a minimum.

Other objects are, to provide a rectifier which is simple in construction, effective in its operation, and cheap to manufacture.

Further objects will appear from the detail description taken in connection with the accompanying drawing, in which:

Figure 1 is a diagram of a rectifier system embodying this invention,

Fig. 2 is a diagram illustrating the operation,

Fig. 3 is a diagram of a rectifier system illustrating another embodiment of this invention, Fig. 4 is a diagram of a rectifier system illustrating another embodiment of this invention, Fig. 5 is a diagram of a rectifier system illustrating still another embodiment of this invention, and, Fig. 6 is a detail showing the construction of the magnet.

Referring to the accompanying drawing, and more particularly, to Figs. 1 and 6, 10 designates a permanent magnet having a long leg 11 and a short leg 12 bent at an angle to form an air gap 13 between the legs 11 and 12. A soft iron core 14 is attached to the short leg of the magnet, and this core is slit, as shown at 15, to prevent the formation of eddy currents. A bracket 16, forming a magnetic bridge, is mounted on the leg 11 by a screw 17 passing through an elongated slot 18 in the bracket and threaded into the leg 11, whereby this bridge may be adjusted vertically to vary the effective length of the gap 13. The core 14 has an alternating current winding 19. A vibrator or armature 20, of usual construction, and comprising a resilient reed provided with a soft iron plate, is fixed at one end, in a support 21 and is provided, at its free end, with a switching contact 22 adapted to coöperate with an adjustable switching contact 23.

The source of alternating current 24 is connected to the rectifier through a step-down transformer having a primary 25 and a secondary 26. The secondary 26 is connected in shunt with the winding 19 through a regulating resistance 27. The direct current load, shown as a storage battery 28, is connected in series with the vibrator and a regulating resistance 29 across the terminals of the secondary 26 and, therefore, in shunt to the winding 19.

The permanent magnet will set up a constant magnetic field or flux in its magnetic circuit through a main path, comprising, the yoke of the magnet, the short leg 12, the gap 13, and the upper part of the long leg 11. There will also be a leakage or shunt path through the core 14, the armature of the vibrator 20 and the lower part of the long leg 11. The permanent magnet will set up a flux of constant strength in this leakage path or circuit. The alternating current winding 19, which is in circuit with the source of alternating current, sets up in this leakage path and, therefore, superimposes on the constant leakage flux, an alternating flux which is in step with the current from said source. The combined action of these fluxes is shown in Fig. 2. In this figure, O represents the zero line, A the constant flux in the leakage path due to the permanent magnetism in the permanent magnet, and B the alternating flux due to the winding 19. The resultant flux due to the constant and the alternating fluxes is shown by the line C, and it will be noted that this flux is also an alternating flux which has a maximum value equal to the sum of the constant flux and the maximum value of the alternating flux, and which has a minimum value equal to the difference between the alternating and the constant fluxes. The resultant flux will, therefore, be nearly unidirectional, but will increase and decrease in value in step with the alternating flux, but at one-half its frequency. The vibrator is so constructed that its period of vibration corresponds to the period of the alternating current. This vibrator will, therefore, vibrate in synchronism with the source of alternating current, and the battery will, therefore, be connected to the source of alternating current during one-half of the wave (in this case the upper half) of the alternating current, while it will be disconnected during the other half. The current will, therefore, pass through the battery in the same direction.

The apparatus can be adjusted for variations in frequency, as well as for compensating for the induction of the magnet and for the lag of the vibrator. In order to compensate for the induction of the magnet and any lag of the vibrator, the resistance 27 is varied, or the effective length of the gap 13 is varied by adjustment of the bridge 16. Variation of the resistance 27 will vary the value of the alternating field, while, variation of the gap 13 will vary the strength of the leakage flux. From a reference to Fig. 2, it will be noted that the variation of the strength of the alternating flux or the strength of the leakage flux, will vary the strength of the resultant flux. Since the vibrator will begin to move as soon as the resultant field reaches a certain maximum or minimum strength, it will readily be seen that by varying the strength of this resultant field, the point at which the vibrator begins to move and, therefore, begins to close and open the switching contacts, can be varied during the cycle of operations, so as to vary the time of make and break of the circuit. In this way, the apparatus can be adjusted so as to operate over a considerable range of frequency without sparking. It has been found that this apparatus will operate over a range of frequency from 55 to 67, i. e., over a range of twelve cycles.

In this construction the constant flux is set up by a permanent magnet, which will always cause the terminals to have the same polarity, so that there is no liability of passing current through the battery in the wrong direction. It will also be noted that the constant flux is a leakage flux, and that the alternating flux is superimposed on this leakage flux so as to pass through a shunt circuit.

It will, of course, be understood that the flux in the main magnetic path, being of greater strength than that in the shunt magnetic path, this permanent main flux exceeds the alternating flux. The alternating flux component which is opposite to that of the permanent flux, therefore, does not pass through the entire magnetic circuit of the permanent magnet, but passes merely through the poles of this magnet, which poles may be made of soft iron. The alternating flux, therefore, has no demagnetizing effect on this permanent magnet, so that the magnetism of this permanent magnet, and, therefore, the leakage flux, will always be permanent and uniform.

In the construction shown in Fig. 1 only one-half of the wave is utilized and the load factor will, therefore, not be greater than 50%. In the construction shown in Figs. 3 and 4, the apparatus is so constructed as to utilize both waves. In these figures, the same reference characters are used to designate like parts as shown in Fig. 1, and a detail description of these parts will, therefore, be omitted.

Fig. 3 shows a construction in which the permanent magnet 35 has laterally projecting pole pieces 36 and 37, so as to form an air gap. Soft iron cores, of the same construction as shown in Fig. 1, are attached to these pole pieces, and are provided with alternating current windings 38 and 39, connected in shunt to the secondary 26 of the transformer, and in series with a regulating resistance 27. The vibrator 40 is of the double acting type, and this vibrator is provided with a resilient stem 41 fixed at 42 and provided with an adjustable weight 43 threaded upon a stem 44 so as to vary the period of vibration of the vibrator. The ends of the vibrator are provided with contacts 22 coöperating with adjustable contacts 23. The battery 28 to be charged is connected to the vibrator and to the center tap of the transformer secondary, as shown in Fig. 3. In this case, a regulating resistance 29 is provided in each branch.

It will be noted that the cores carrying the alternating current windings 38 and 39 form, together with the armature or vibrator, a leakage circuit. The leakage flux will normally form N and S poles at the ends of the cores opposite the vibrator, corresponding to the N and S poles on the permanent magnet. The windings 38 and 39 are so wound that they will form like poles; thus, the winding 38 will form an N pole on one core and an N pole on the other core, and upon reversal of the alternating flux, will form an S pole at each free end of ecah core. It will, of course, be understood that each winding 38 and 39, tends to set up dissimilar or unlike poles at its core ends, and that the free ends of these cores, while always alike in sign, vary from N to S, due to the alternating flux. During one instance, therefore, as shown in Fig. 3, the right core will be of double strength while the left core will be practically of zero strength, so that the right end of the vibrator will move up. During the reversal of the flux, the left core will be of double strength while the right core will have zero strength, thereby causing the left end of the vibrator to move up. With this construction, therefore, the alternating current source is connected in circuit with the direct current circuit during both waves, so that the apparatus will have a 100% load factor. It will be understood that, in this construction, as in Fig. 1, the strength of the leakage flux and of the alternating flux may be varied in the same manner by varying the length of the gap and by varying the resistance 27.

In Fig. 4 is shown a double acting rectifier. In this case, the rectifier comprises two magnets, of the construction shown in Figs. 1 and 6, connected in series and coöperating with a vibrator, as shown in Fig. 3. The operation of this apparatus is practically the same as shown in Fig. 3, and further description will, therefore, be unnecessary.

In Fig. 5, the rectifiers are connected in series with the secondaries 26 of a transformer having either common or separate primaries 25. Each of these rectifiers is of substantially the same construction as shown in Fig. 1, and the connections are practically the same. The rectifiers are, in this case, connected in series with the battery or direct current load 28, so as to operate together at double voltage. In order to equalize the potential across the spark gaps, condensers 45 are interposed so that if one gap opens before the other, the latter will not be required to take the combined voltage on both rectifiers. These condensers may be lead plates in acid, or aluminum plates in ammonium phosphate, or they may be of the static type. Instead of using condensers, an equalizing connection or tap 46 to the battery may be used, or both condensers and equalizing tap may be used together.

It is obvious that various changes may be made in details of construction without departing from the spirit of this invention, and it is, therefore, to be understood that this invention is not to be limited to the specific construction shown and described.

Having thus described the invention, what is claimed is:

1. A rectifier for alternating currents, comprising a permanent magnet having means adapted to form a main magnetic path and means adapted to form a shunt magnetic path, means for setting up an alternating flux in said shunt path, and a switching armature adapted to vibrate in said shunt path.

2. A rectifier for alternating currents, comprising, a permanent magnet having means adapted to form a nearly closed magnetic circuit and means adapted to form a shunt magnetic path, means for setting up an alternating flux in said shunt path, and a switching armature adapted to vibrate in said shunt path.

3. A rectifier for alternating currents, comprising, a permanent magnet having legs and having a bridge between said legs, adapted to form a main magnetic path and means adapted to form a shunt magnetic path, an alternating current winding arranged to set up an alternating flux in said shunt path, and a switching armature adapted to vibrate in said shunt path.

4. A rectifier for alternating currents, comprising, a permanent magnet having means adapted to form a main magnetic path and means adapted to form a shunt magnetic path, an alternating current winding arranged to set up an alternating flux in said shunt path, and a switching armature adapted to vibrate in said shunt path and connected with said winding.

5. A rectifier for alternating currents, comprising, a permanent magnetic circuit member and a core, adapted to form a main magnetic path and means adapted to form a shunt magnetic path traversing said core, an alternating current winding on said core, and a switching armature adapted to vibrate in said shunt path.

6. A rectifier for alternating currents, comprising, a permanent magnet having means adapted to form a main magnetic path and means adapted to form a shunt magnetic path, means for setting up an alternating flux in said shunt path, a switching armature adapted to vibrate in said shunt path, and means for varying the shunt path.

7. A rectifier for alternating currents, comprising, a permanent magnet having means adapted to form a main magnetic path and means adapted to form a shunt magnetic path, means for setting up an alternating flux in said shunt path, a switching armature adapted to vibrate in said shunt path, and means for varying the alternating flux.

8. An alternating current rectifier system, comprising, a permanent magnet having means adapted to form a main magnetic path and means adapted to form a shunt magnetic path, an alternating current winding adapted to set up an alternating flux in said shunt path, a source of alternating current connected with said winding, a direct current circuit, and a switching armature adapted to connect said source with said circuit.

9. A rectifier for alternating currents comprising a magnet constructed to form a gap, a longitudinally slotted core projecting from said magnet to form a shunt path, a winding on said core adapted for connection to a source of alternating current, and a switching armature constructed to vibrate in said path.

In testimony whereof I affix my signature in the presence of these two witnesses.

EDWIN C. BALLMAN.

Witnesses:
J. H. BRUNINGA,
ARTHUR B. CREMER.